(12) United States Patent
Park et al.

(10) Patent No.: US 11,982,976 B2
(45) Date of Patent: May 14, 2024

(54) HOLOGRAM TRANSCRIPTION APPARATUS

(71) Applicant: HANGYO HOLOGRAM CO., LTD., Seoul (KR)

(72) Inventors: Sung Chul Park, Seoul (KR); Eun Seok Kim, Chungcheongbuk-do (KR); In Hwan Oh, Gyeonggi-do (KR)

(73) Assignee: HANGYO HOLOGRAM CO., LTD., Gangnam-gu Seoul (KR)

( * ) Notice: Subject to any disclaimer, the term of this patent is extended or adjusted under 35 U.S.C. 154(b) by 493 days.

(21) Appl. No.: 17/283,654

(22) PCT Filed: Oct. 8, 2019

(86) PCT No.: PCT/KR2019/013229
§ 371 (c)(1),
(2) Date: Apr. 8, 2021

(87) PCT Pub. No.: WO2020/076068
PCT Pub. Date: Apr. 16, 2020

(65) Prior Publication Data
US 2021/0356908 A1 Nov. 18, 2021

(30) Foreign Application Priority Data
Oct. 12, 2018 (KR) .......................... 10-2018-0121983

(51) Int. Cl.
*G03H 1/04* (2006.01)
*G03H 1/00* (2006.01)

(52) U.S. Cl.
CPC ......... *G03H 1/0465* (2013.01); *G03H 1/0005* (2013.01); *G03H 2001/0413* (2013.01); *G03H 2001/0415* (2013.01); *G03H 2001/0473* (2013.01); *G03H 2227/03* (2013.01)

(58) Field of Classification Search
CPC .................................. G03H 1/202; G03H 1/26
USPC .................................................. 355/2; 359/12
See application file for complete search history.

(56) References Cited

U.S. PATENT DOCUMENTS

| | | | | |
|---|---|---|---|---|
| 3,522,979 A | * | 8/1970 | Wuerker | ................... G03H 1/20 355/2 |
| 4,209,250 A | * | 6/1980 | James | ..................... G03H 1/202 355/30 |
| 5,798,850 A | * | 8/1998 | Ishikawa | ................ G03H 1/202 430/1 |
| 8,564,864 B2 | | 10/2013 | Kihara et al. | |

(Continued)

FOREIGN PATENT DOCUMENTS

| | | | | |
|---|---|---|---|---|
| CN | 101794111 A | | 8/2010 | |
| CN | 104749684 A | * | 7/2015 | ......... G02B 27/0103 |

(Continued)

OTHER PUBLICATIONS

Translation of CN104749684 (Year: 2015).*
(Continued)

*Primary Examiner* — Steven Whitesell Gordon
(74) *Attorney, Agent, or Firm* — HoustonHogle LLP (57) ABSTRACT

Provided is a hologram transcription apparatus including: an exposure part; and a light source part for irradiating light to the exposure part. Here, the exposure part includes a transfer unit for transferring a hologram film, and the exposure part is rotatable to change an angle formed with the light.

14 Claims, 11 Drawing Sheets

(56) References Cited

U.S. PATENT DOCUMENTS

| | | | |
|---|---|---|---|
| 8,599,458 B2 | 12/2013 | Dausmann | |
| 2007/0183011 A1* | 8/2007 | Yamauchi | G03H 1/26 359/22 |
| 2011/0170395 A1 | 7/2011 | Tatsuta et al. | |

FOREIGN PATENT DOCUMENTS

| | | |
|---|---|---|
| JP | H03148687 | 6/1991 |
| JP | H05249877 | 9/1993 |
| JP | H06274088 | 9/1994 |
| JP | H0777923 | 3/1995 |
| JP | H07114330 A | 5/1995 |
| JP | 2000-162951 A | 6/2000 |
| JP | 2001-331084 A | 11/2001 |
| JP | 2004287000 A | 10/2004 |
| JP | 2011164493 A | 8/2011 |
| JP | 2011-232511 A | 11/2011 |
| JP | 6044092 B2 | 12/2016 |
| KR | 10-2003-0019988 A | 3/2003 |

OTHER PUBLICATIONS

International Search Report and Written Opinion of the International Searching Authority, dated Jan. 20, 2020, from International Application No. PCT/KR2019/013229, filed on Oct. 8, 2019. 5 pages.
Written Opinion, dated Jan. 20, 2020, from International Application No. PCT/KR2019/013229, filed on Oct. 8, 2019. 5 pages.
International Preliminary Report on Patentability dated Apr. 22, 2021, from International Application No. PCT/KR2019/013229, filed on Oct. 8, 2019. 12 pages.

* cited by examiner

HOLOGRAM TRANSCRIPTION APPARATUS

RELATED APPLICATIONS

This application is a § 371 National Phase Application of International Application No. PCT/KR2019/013229, filed on Oct. 8, 2019, now International Publication No. WO 2020/076068 A1, published on Apr. 16, 2020, which International Application claims priority to Korean Application 10-2018-0121983, filed on Oct. 12, 2018, both of which are incorporated herein by reference in their entirety.

TECHNICAL FIELD

The present invention relates to a hologram transcription apparatus, and more particularly, to a hologram transcription apparatus capable of selectively manufacturing a transmission-type hologram and a reflection-type hologram by using one apparatus and simply adjusting a transcription angle.

BACKGROUND ART

A hologram is made by causing an interference between an object wave, which is light reflected or diffracted by an object, and a reference wave, and recording an interference pattern in a photosensitive material.

Since Dennis Garbor first invented the hologram, the most universal methods so far are the two beam transmission hologram developed by E, Leith, etc. and the one beam reflection hologram developed by Denisyuk, etc. The transmission hologram allows a hologram to be played in a direction opposite to the reference wave by allowing the reference wave and the object wave to be incident in the same direction with respect to a record medium when recorded and allowing the reference wave to be transmitted through the hologram recorded in the record medium when played. The reflection hologram allows a hologram to be played in the same direction as the reference wave by allowing the reference wave and the object wave to be incident in the opposite direction with respect to the record medium when recorded and allowing the reference wave to be reflected by the hologram when played.

The above-described holograms may be manufactured by irradiating each of the object wave and the reference wave to the photosensitive material and also manufactured by a method of manufacturing a hologram original plate (a master) and copying the same.

DISCLOSURE OF THE INVENTION

Technical Problem

The present invention is to provide a hologram transcription apparatus capable of simply adjusting a light irradiation angle.

The present invention is to provide a hologram transcription apparatus capable of adjusting a light irradiation angle to manufacture various holograms.

The present invention is to provide a hologram transcription apparatus capable of manufacturing all of a transmission-type hologram and a reflection-type hologram by using one apparatus.

The present invention is to provide a hologram transcription apparatus capable of allowing a hologram film to closely contact a hologram original plate.

The present invention is to provide a hologram transcription apparatus capable of preventing bubbles and foreign substances from being introduced between a hologram film and a hologram original plate.

The present invention is to provide a hologram transcription apparatus capable of preventing vibration.

The present invention is to provide a hologram transcription apparatus capable of preventing a transcription distortion phenomenon.

The present invention is to provide a hologram transcription apparatus capable of preventing a hologram film from being deformed by a tension.

The object of the present invention is not limited to the aforesaid, but other objects not described herein will be clearly understood by those skilled in the art from descriptions below.

Technical Solution

In order to achieve the objects, a hologram transcription apparatus according to exemplary embodiments of the present invention includes: an exposure part; and a light source part configured to irradiate light to the exposure part, wherein the exposure part includes a transfer unit configured to transfer a hologram film, and the exposure part is rotatable to change an angle formed with the light.

In order to achieve the objects, in the hologram transcription apparatus according to exemplary embodiments of the present invention, the exposure part may further include a hologram original plate, and the transfer unit may seat the hologram film on the hologram original plate.

In order to achieve the objects, in the hologram transcription apparatus according to exemplary embodiments of the present invention, the hologram original plate may be rotatable with respect to the transfer unit.

In order to achieve the objects, in the hologram transcription apparatus according to exemplary embodiments of the present invention, the hologram original plate may include a first surface and a second surface distinguished from the first surface, the transfer unit may include a first roller and a second roller, the first roller may move the hologram film onto the first surface, and the second roller may move the hologram film onto the second surface.

In order to achieve the objects, in the hologram transcription apparatus according to exemplary embodiments of the present invention, the light source part may include: a light source configured to emit light; and a reflection mirror configured to reflect the light emitted from the light source and irradiate the light to the exposure part, and the exposure part may be rotated around a point at which a central axis of the light reflected by the reflection mirror meets the hologram film.

In order to achieve the objects, in the hologram transcription apparatus according to exemplary embodiments of the present invention, the light source part may further include a filter disposed between the light source and the reflection mirror, and the filter may include: a lens configured to magnify the light emitted from the light source; and a pin hole configured to rectify the light magnified by the lens.

In order to achieve the objects, in the hologram transcription apparatus according to exemplary embodiments of the present invention, the light reflected by the reflection mirror may be irradiated to the hologram film in the form of parallel light.

In order to achieve the objects, in the hologram transcription apparatus according to exemplary embodiments of the present invention, the exposure part may form an angle of 0° to 180° with the light.

In order to achieve the objects, a hologram transcription apparatus according to exemplary embodiments of the present invention includes: a hologram original plate on which a first surface and a second surface disposed at an opposite side of the first surface are defined; a transfer unit configured to transfer a hologram film and seat the hologram film on the hologram original plate; and a light source part configured to irradiate light to the hologram original plate, wherein the transfer unit includes a first roller and a second roller, the first roller moves the hologram film onto the first surface, and the second roller moves the hologram film onto the second surface.

In order to achieve the objects, in the hologram transcription apparatus according to exemplary embodiments of the present invention, the transfer unit may further include: a first contact roller disposed adjacent to the first surface; and a second contact roller disposed adjacent to the second surface, and the first contact roller and the second contact roller may be moved in a direction parallel to an extension direction of the hologram original plate in a state in which the hologram film contacts the first surface or the second surface.

In order to achieve the objects, in the hologram transcription apparatus according to exemplary embodiments of the present invention, the first roller may include a first sub-roller and a second sub-roller, and the hologram film may be transferred between the first sub-roller and the second sub-roller and moved onto the first surface. Also, the second roller may include a third sub-roller and a fourth sub-roller, and the hologram film may be transferred between the third sub-roller and the fourth sub-roller and moved onto the second surface.

In order to achieve the objects, the hologram transcription apparatus according to exemplary embodiments of the present invention may further include a protection film supply part, wherein the protection film supply part may attach a protection film to the hologram film that passes through the hologram original plate.

In order to achieve the objects, the hologram transcription apparatus according to exemplary embodiments of the present invention may further include a cleaning part, wherein the cleaning part may clean the hologram film to which the protection film is attached.

In order to achieve the objects, in the hologram transcription apparatus according to exemplary embodiments of the present invention, the hologram original plate may be rotatable with respect to an irradiation direction of the light.

In order to achieve the objects, in the hologram transcription apparatus according to exemplary embodiments of the present invention, the hologram original plate may be rotated around a point at which a central axis of the light irradiated to the hologram original plate meets the hologram original plate.

Particularities of other embodiments are included in the detailed description and drawings.

Advantageous Effects

According to the hologram transcription apparatus of the present invention, the light irradiation angle may be simply adjusted.

According to the hologram transcription apparatus of the present invention, the light irradiation angle may be adjusted to manufacture various holograms.

According to the hologram transcription apparatus of the present invention, all of the transmission-type hologram and the reflection-type hologram may be manufactured by using one apparatus.

According to the hologram transcription apparatus of the present invention, the hologram film may closely contact the hologram original plate.

According to the hologram transcription apparatus of the present invention, the bubbles and the foreign substances may be prevented from being introduced between the hologram film and the hologram original plate.

According to the hologram transcription apparatus of the present invention, the vibration may be prevented.

According to the hologram transcription apparatus of the present invention, the transcription distortion phenomenon may be prevented.

According to the hologram transcription apparatus of the present invention, the hologram film may be prevented from being deformed by the tension.

The effects of the present invention are not limited to the aforementioned effects, but other effects not described herein will be clearly understood by those skilled in the art from descriptions below.

MODE FOR CARRYING OUT THE INVENTION

Exemplary embodiments of the present invention will be described with reference to the accompanying drawings so as to sufficiently understand constitutions and effects of the technical idea of the present invention. The technical ideas of the present invention may, however, be embodied in different forms and should not be construed as limited to the embodiments set forth herein. Rather, these embodiments are provided so that this disclosure will be thorough and complete, and will fully convey the scope of the present invention to those skilled in the art.

Like reference numerals refer to like elements throughout. The embodiment in this specification will be described with reference to block diagrams, perspective views and/or cross-sectional views as ideal exemplary views of the present invention. Also, in the figures, the dimensions of layers and regions are exaggerated to effectively explain technical features. Areas exemplified in the drawings have general properties, and the shapes of the areas exemplified in the drawings are used to illustrate a specific shape of a device region and should not be construed as limiting the scope of the present invention. Also, although various terms are used to describe various components in various embodiments of this specification, the components should not be limited to these terms. These terms are only used to distinguish one component from another component. Embodiments described and exemplified herein also include complementary embodiments thereof.

The terms used herein are used only for explaining embodiments and are not intended to limit the present invention. In this specification, the terms of a singular form may include plural forms unless particularly indicated in the context. The meaning of "comprises" and/or "comprising" specifies a component but does not exclude other components.

Hereinafter, the present invention will be described in detail by explaining preferred embodiments of the present invention with reference to the attached drawings.

Figure 1:
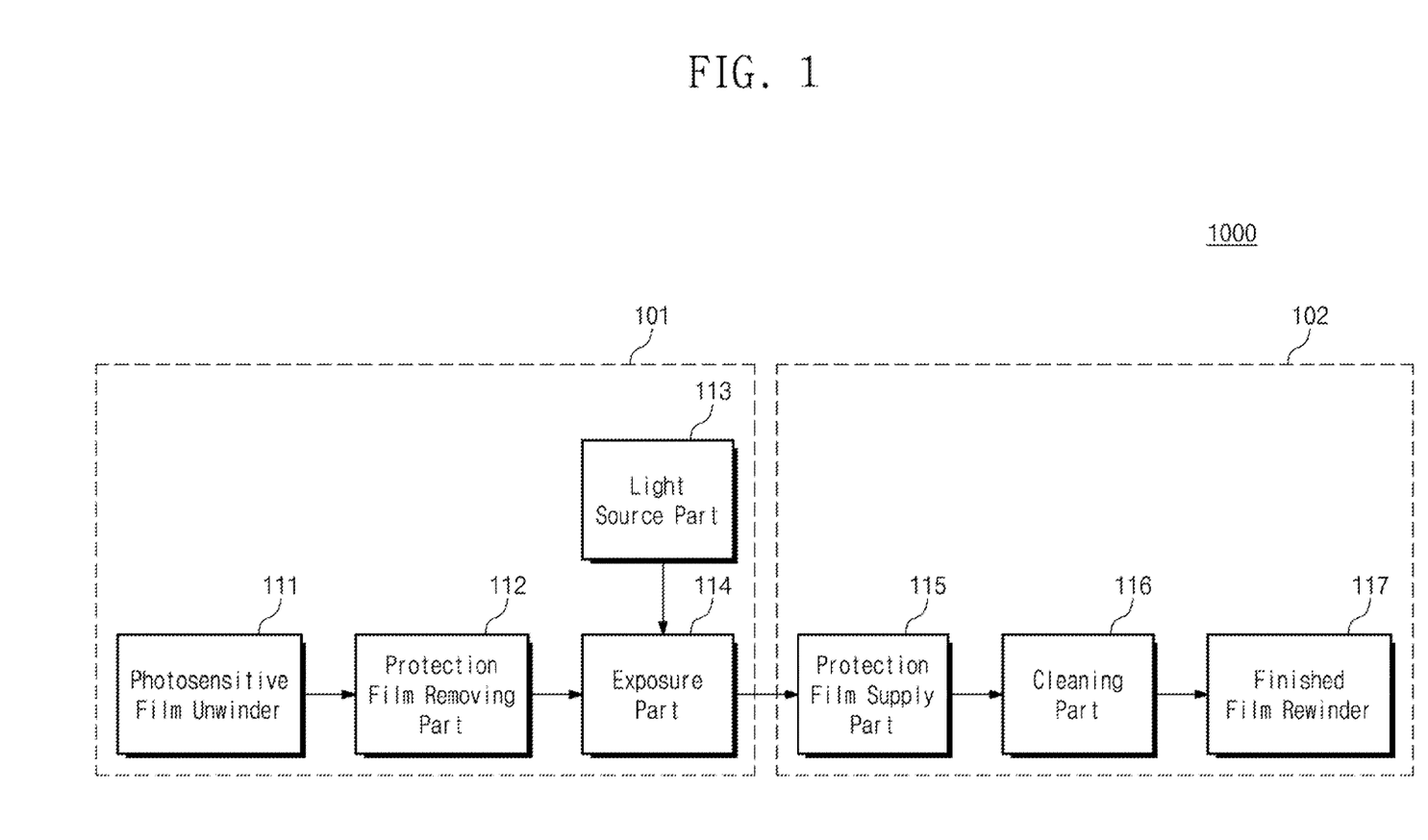
FIG. 1 is a schematic view illustrating a hologram transcription apparatus according to exemplary embodiments of the present invention.
Figure 2:
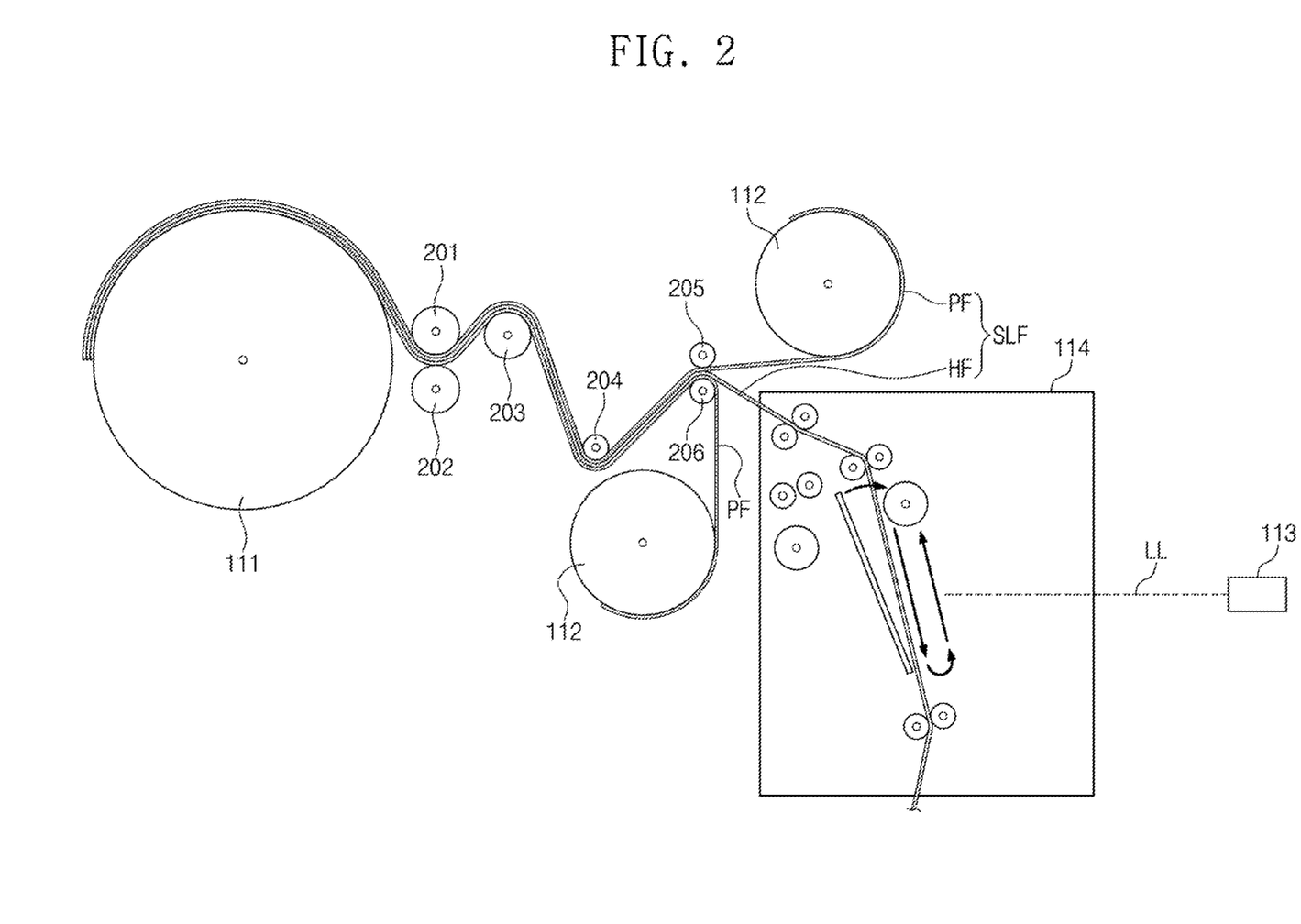
FIG. 2 is a cross-sectional view illustrating a supplying device of the hologram transcription apparatus according to the exemplary embodiments of the present invention.

FIG. 1 is a schematic view illustrating a hologram transcription apparatus according to exemplary embodiments of the present invention, and FIG. 2 is a cross-sectional view illustrating a supplying device of the hologram transcription apparatus according to the exemplary embodiments of the present invention.

Referring to FIG. 1, a hologram transcription apparatus 1000 may include a supplying device 101 and a rewinding device 102.

The supplying device 101 may include a photosensitive film unwinder 111, a protection film removing part 112, a light source part 113, and an exposure part 114.

The photosensitive film unwinder 111 may unwind a photosensitive film SLF and move the photosensitive film SLF to the protection film removing part 112. In embodiments, the photosensitive film unwinder 111 may include a roller as illustrated in FIG. 2. The photosensitive film unwinder 111 may move the photosensitive film SLF to auxiliary rollers 205 and 206 while being rotated.

Referring to FIGS. 1 and 2, the photosensitive film SLF may include a hologram film HF and a protection film PF. In the embodiments, the protection film PF may be provided in plurality. The plurality of protection films PF may be attached to both surfaces of the hologram film HF. That is, the hologram film HF may be disposed between the protection films PF. The protection film PF may protect the hologram film HF from an external impact. In the embodiments, the hologram film HF may include a base film (not shown) and a photosensitive material (not shown). The photosensitive material may be disposed on one surface of the base film. For example, the base film may include triacetyl cellulose (TAC), transparent polyester (PET), polypropylene (PP), polyvinyl chloride (PVC), and polycarbonate (PC). However, the embodiment of the present invention is not limited thereto.

The photosensitive film SLF supplied from the photosensitive film unwinder 111 may be moved to the auxiliary rollers 205 and 206 by auxiliary rollers 201 to 204. Referring to FIG. 2, the photosensitive film SLF may be moved through the first to sixth auxiliary rollers 201 to 206. However, the embodiment of the present invention is not limited thereto, and the number and position of the auxiliary rollers may be variously changed.

After the photosensitive film SLF is moved by the auxiliary rollers 201 to 206, the protection film PF of the photosensitive film SLF may be removed by the protection film removing part 112. In the embodiments, the protection film removing part 112 may include a rewinder roller. The rewinder roller may be provided in plurality. One roller may be rotated in a counter-clockwise direction to remove the protection film PF disposed at an upper side of the hologram film HF. The other roller may be rotated in a clockwise direction to remove the protection film PF disposed at a lower side of the hologram film HF. However, the embodiment of the present invention is not limited thereto, and the shape of the protection film removing part 112 may be variously deformed.

After the protection films PF is removed, the hologram film HF may be provided to the exposure part 114.

Figure 3:
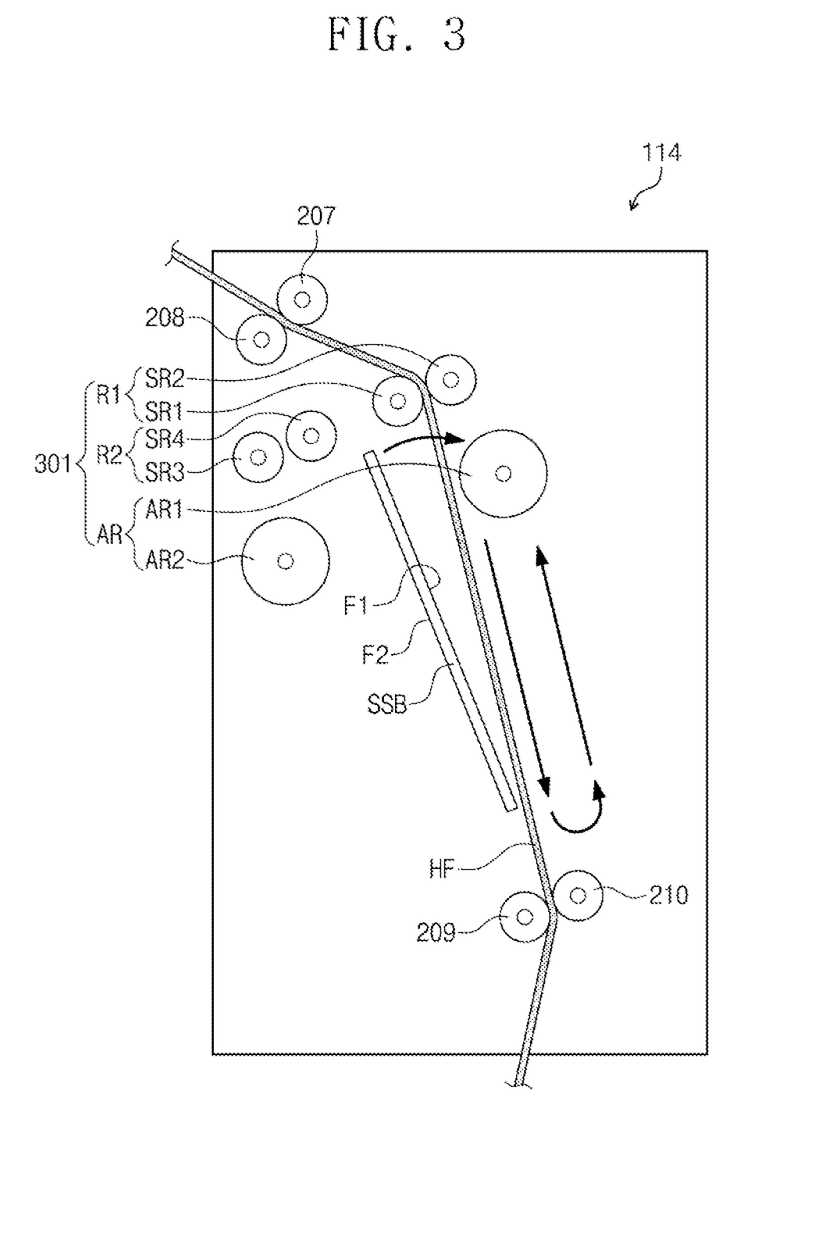
FIG. 3 is a cross-sectional view illustrating an exposure part of the hologram transcription apparatus according to the exemplary embodiments of the present invention.

FIG. 3 is a cross-sectional view illustrating the exposure part of the hologram transcription apparatus according to the exemplary embodiments of the present invention.

Referring to FIG. 3, the exposure part 114 may include a transfer unit 301 and a hologram original plate SSB. In the embodiments, the exposure part 114 may further include a housing surrounding the transfer unit 301 and/or the hologram original plate SSB.

The exposure part 114 may be moved at an arbitrary angle. In the embodiments, the transfer unit 301 and the hologram original plate SSB may be freely moved at an arbitrary angle. More specifically, the transfer unit 301 and the hologram original plate SSB may be moved to form an appropriate angle with light LL emitted from the light source part 113. The transfer unit 301 and the hologram original plate SSB may be moved in an integrated manner with an arbitrary angle. A detailed description thereof will be described later with reference to FIGS. 4A and 4B.

The transfer unit 301 may include first rollers R1 and second rollers R2. The hologram film HF may be moved to the first rollers R1 by auxiliary rollers 207 and 208. In an embodiment of the present invention, the first rollers R1 may include a first sub-roller SR1 and a second sub-roller SR2. The hologram film HF may be moved between the first sub-roller SR1 and the second sub-roller SR2. More specifically, the first sub-roller SR1 and the second sub-roller SR2 may be rotated in directions opposite to each other to move the hologram film HF toward the hologram original plate SSB. The hologram film HF may be moved to contact the hologram original plate SSB.

The hologram original plate SSB may be a hologram. An interference pattern of light may be recorded in the hologram original plate SSB. The hologram original plate SSB may have a thin plate shape. A first surface F1 and a second surface F2 may be defined on the hologram original plate SSB. The second surface F2 may be an opposite surface of the first surface F1. The first rollers R1 may move the hologram film HF onto the first surface F1. More specifically, the hologram film HF may contact the first surface F1 through the first rollers R1.

The transfer unit 301 may further include a contact roller AR1 and AR2. The contact roller may be provided in plurality. For example, the contact rollers AR1 and AR2 may include a first contact roller AR1 and a second contact roller AR2 as illustrated in FIG. 3. The first contact roller AR1 may be disposed adjacent to the first surface F1. The second contact roller AR2 may be disposed adjacent to the second surface F2. In a state in which the hologram film HF contacts the first surface F1, the first contact roller AR1 may be moved so that the hologram film HF closely contacts the first surface F1. More specifically, the first contact roller AR1 may be moved in a direction parallel to an extension direction of the hologram original plate SSB in a state of contacting the hologram film HF. In the embodiments, the first contact roller AR1 may be moved in the extension direction of the hologram original plate SSB or moved in a direction opposite to the extension direction of the hologram original plate SSB, so that the hologram film HF closely contacts the first surface F1. The hologram film HF may be disposed between the hologram original plate SSB and the first contact roller AR1.

As the first contact roller AR1 allows the hologram film HF to closely contact the hologram original plate SSB, bubbles and foreign substances may be prevented from being introduced between the hologram original plate SSB and the hologram film HF. Transcription of a hologram may be prevented from being distorted by unnecessary deformation of a light path or a deformation of the light as the light LL is scattered by the bubbles and the foreign substances. The hologram film HF and the hologram original plate SSB may be moved in an integrated manner by allowing the hologram film HF to closely contact the hologram original plate SSB. A transcription distortion phenomenon of the hologram, which is generated by a vibration, may be prevented. A problem which the hologram film HF is deformed by tension because of repeating contact and separation with the hologram original plate SSB may be improved.

The second rollers R2 and the second contact roller AR2 will be described later with reference to FIG. 7.

Figure 4A:
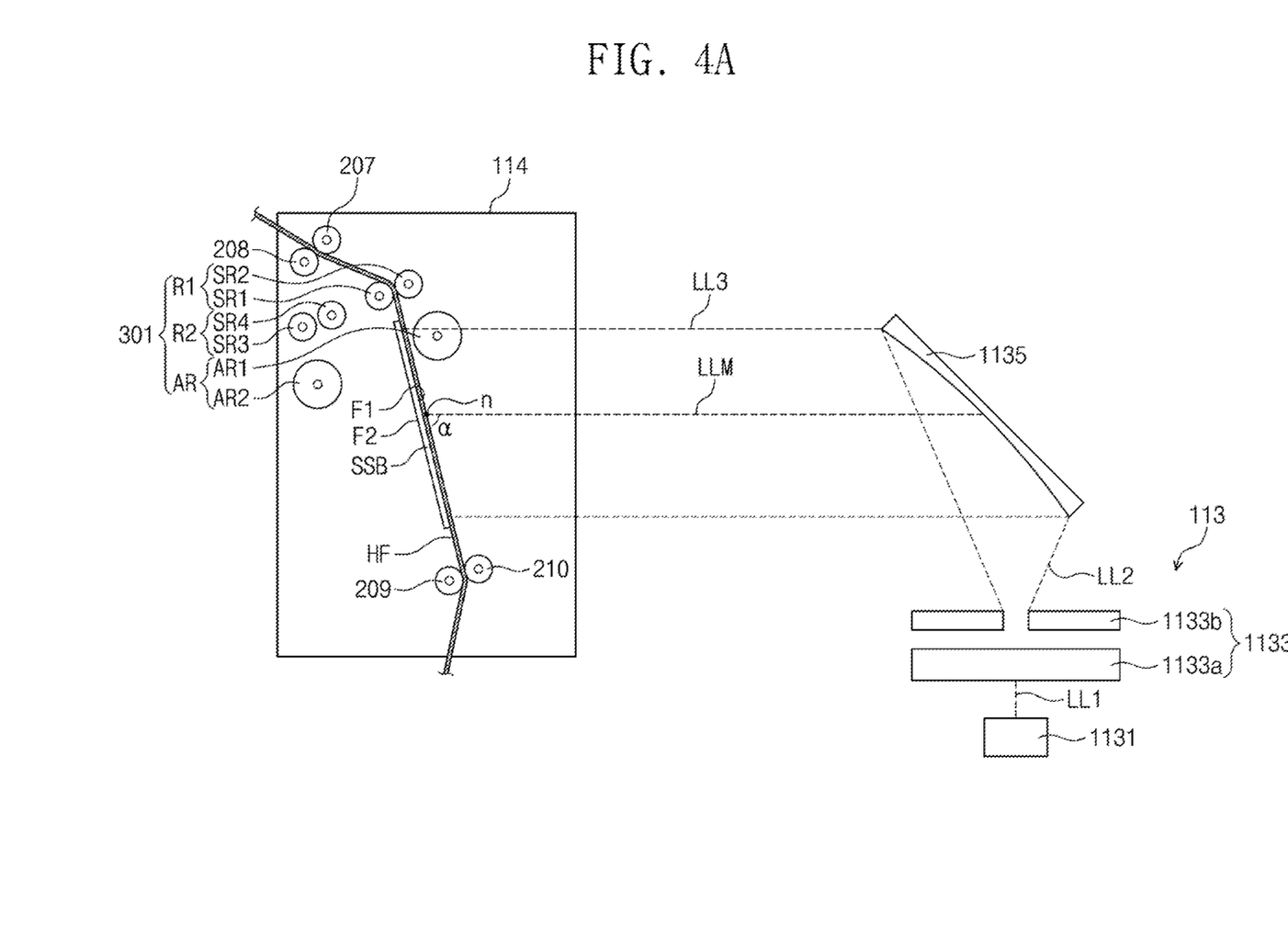
FIG. 4A is a cross-sectional view illustrating a transcription principle of the hologram transcription apparatus according to the exemplary embodiments of the present invention.

FIG. 4A is a cross-sectional view illustrating a transcription principle of the hologram transcription apparatus according to the exemplary embodiments of the present invention.

Referring to FIG. 4A, the light source part 113 may include a light source 1131, a filter 1133, and a reflection mirror 1135.

The light source 1131 may emit light. More specifically, the light source 1131 may emit first light LL1 toward the filter 1133. In the embodiments, the first light LL1 may be a laser beam.

The filter 1133 may receive the first light LL1 and transmit second light LL2 to the reflection mirror 1135. The filter 1133 may include a lens 1133a and a pin hole 1133b. In the embodiments, the lens 1133a may include an objective lens. The lens 1133a may be provided in plurality. The lens 1133a may transmit light to the pin hole 1133b. A hole may be formed at a predetermined position of the pin hole 1133b. The hole may be tiny. In the embodiments, the hole may have a diameter of 10 μm to 25 μm. However, the embodiment of the present invention is not limited thereto. The light may escape through the hole. The second light LL2 that has passed the filter 1133 may be diffused to travel. The second light LL2 may arrive at the reflection mirror 1135.

The reflection mirror 1135 may reflect the second light LL2. Reflected third light LL3 may be irradiated to the hologram film HF. In the embodiments, the reflection mirror 1135 may include a parabolic mirror. The third light LL3 reflected by the reflection mirror 1135 may be parallel light. The third light LL3 may travel in parallel.

At a central point n at which a central axis LLM of the third light LL3 meets the hologram film HF, the central axis LLM and the hologram film HF may form a predetermined angle α. In the embodiments, the angle α may be 0° to 180°.

In the embodiments, the third light LL3 may simultaneously arrive at the entire hologram film HF contacting the first surface F1. The third light LL3 may uniformly arrive at the entire hologram film HF contacting the first surface F1. In the embodiments, an area to which the third light LL3 is irradiated may be greater than an area of the first surface F1.

In the embodiments, the exposure part 114 may further include a light shielding layer (not shown) protecting the hologram film HF from light. The light shielding layer may absorb light except for the third light LL3 exposing the hologram film HF and the hologram original plate SSB.

The hologram may be recorded in the hologram film HF through the third light LL3. More specifically, the third light LL3 may pass through the hologram film HF. When the third light LL3 that has passed through the hologram film HF arrives at the first surface F1 of the hologram original plate SSB, the light may be reflected in an opposite direction by the hologram original plate SSB. A traveling direction of the reflected light may be different from that of the light before reflection. In the embodiments, the traveling direction of the reflected light may form an angle of 0° to 180° with the traveling direction of the light before reflection. The reflected light may travel toward the hologram film HF again. The reflected light may cause interference with light incident to the hologram film HF at the hologram film HF. An interference pattern of the two light may be recorded in the hologram film HF. The hologram film HF in which the interference pattern of the light is recorded may become a hologram. The hologram film HF in which the interference pattern of the light is recorded may be a reflection-type hologram. The interference pattern recorded in the hologram film HF may be substantially the same as or similar to that recorded in the hologram original plate SSB.

The hologram film HF in which the hologram has recorded may be moved to a coupling roller 501 and 502 through an auxiliary roller 209 and 210. This will be described later with reference to FIG. 5.

Figure 4B:
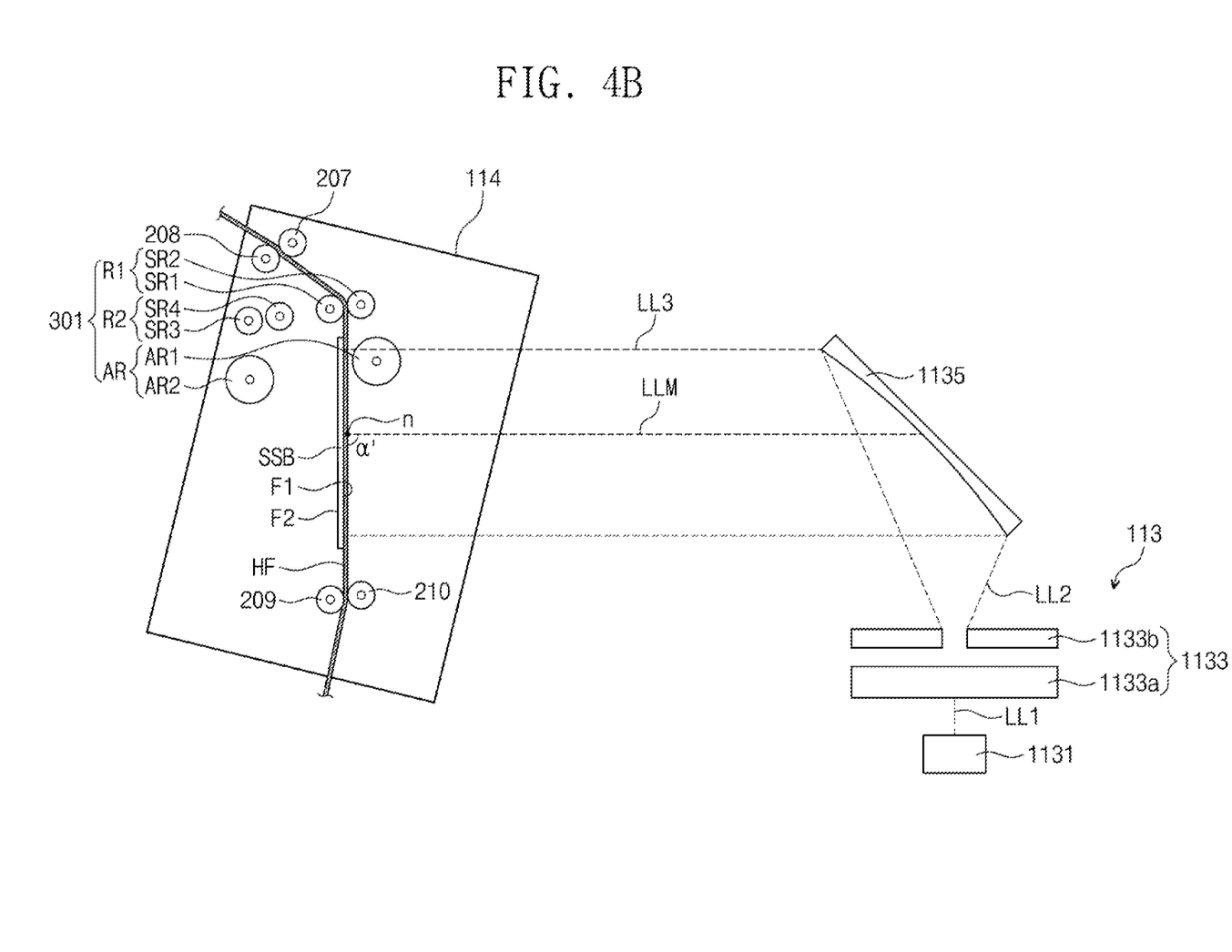
FIG. 4B is a cross-sectional view illustrating an operation process of the hologram transcription apparatus according to the exemplary embodiments of the present invention.

FIG. 4B is a cross-sectional view illustrating an operation process of the hologram transcription apparatus according to the exemplary embodiments of the present invention.

Referring to FIG. 4B, the exposure part 114 may be rotated. In the embodiments, the exposure part 114 may be rotated in the clockwise direction and/or the counter-clockwise direction. More specifically, the exposure part 114 may be rotated around a central point n. As the exposure part 114 is rotated, the hologram original plate SSB and the hologram film HF may be also rotated. The central axis LLM and the hologram film HF may form a predetermined angle α' at the central point n. The angle α and the angle α' may be different from each other.

The rotation of the exposure part 114 may be performed by various units. In the embodiments, the exposure part 114 may be rotated by a rotation shaft connected to the central point n. The rotation shaft may be directly/indirectly connected to a motor capable of rotating the rotation shaft or the like. In the embodiments, the exposure part 114 may be rotated by various units capable of rotating the exposure part 114.

As the exposure part 114 is rotated, an irradiation angle of the third light LL3 arrived at the hologram film HF and the hologram original plate SSB may be variously changed.

Various interference patterns of the light may be recorded in the hologram film HF. Various reflection-type holograms may be manufactured.

According to the hologram transcription apparatus 1000 according to the embodiments of the present invention, since the exposure part 114 is rotated to change the irradiation angle of the light, the holograms may be manufactured at various angles by using one hologram transcription apparatus 1000. Since the exposure part 114 is moved, the light source part 113 may be unnecessary to be moved. The light source 1131, the filter 1133, and/or the reflection mirror 1135 may be unnecessary to be moved in order to rotate the light source part 113. A realignment operation of the light according to the rotation of the light source part 113 may be omitted. A process of manufacturing the hologram may be simplified and quickly performed. A manufacturing cost of the hologram may be reduced.

Figure 5:
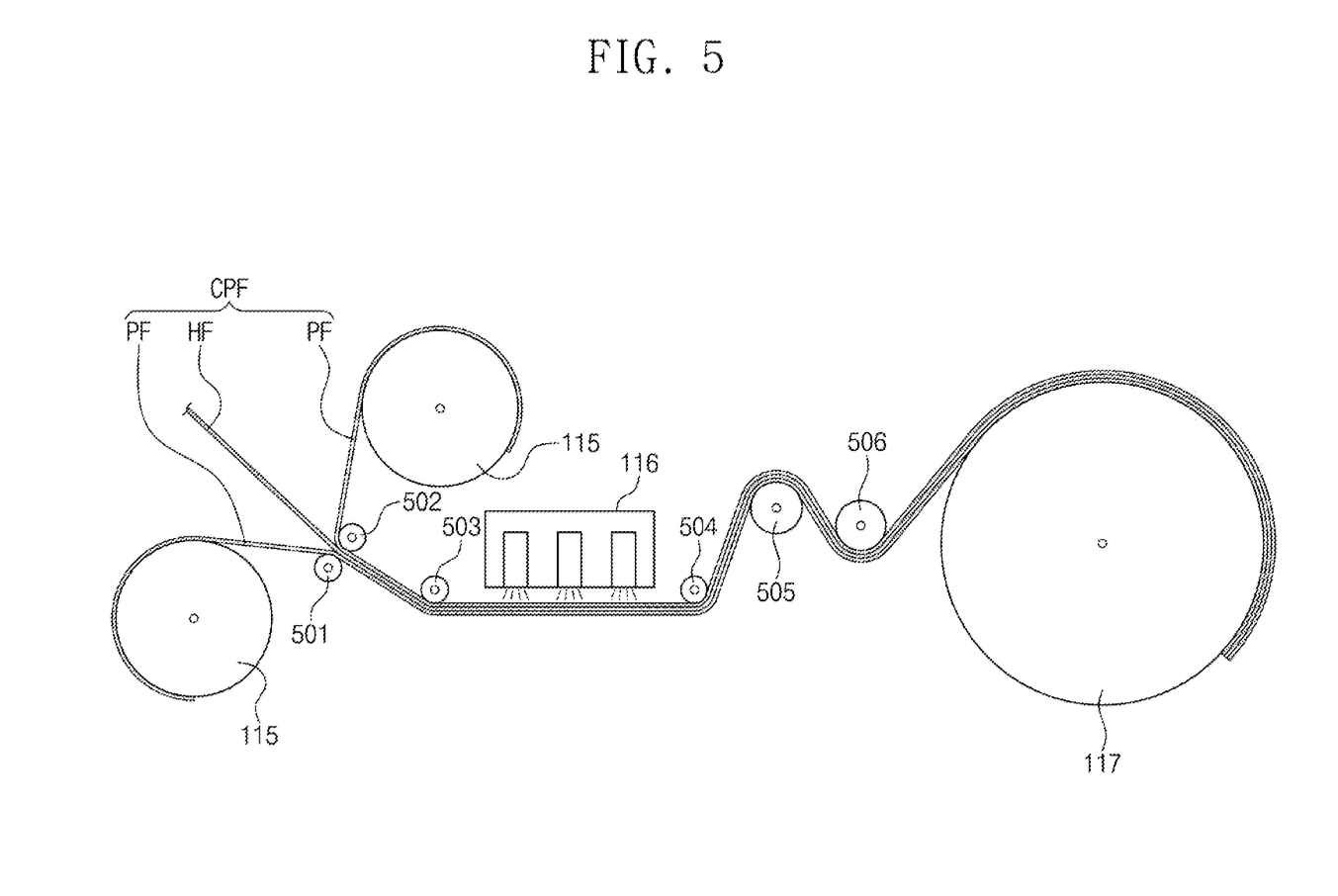
FIG. 5 is a cross-sectional view illustrating a rewinding device of the hologram transcription apparatus according to the exemplary embodiments of the present invention.

FIG. 5 is a cross-sectional view illustrating the rewinding device of the hologram transcription apparatus according to the exemplary embodiments of the present invention.

Referring to FIGS. 1 and 5, the rewinding device 102 may include a protection film supply part 115, a cleaning part 116, and a finished film rewinder 117.

The hologram film HF in which the hologram has recorded may be moved to the coupling roller 501 and 502.

The protection film supply part 115 may supply the protection film PF to the hologram film HF. In the embodiments, the protection film supply part 115 may include two unwinder rollers. One roller may be rotated in the counterclockwise direction to attach the protection film PF to one surface of the hologram film HF. The other roller may be rotated in the clockwise direction to attach the protection film PF to the other surface of the hologram film HF. However, the embodiment of the present invention is not limited thereto, and the protection film supply part 115 may be variously deformed. The protection film PF may be substantially the same as or similar to the protection film described with reference to FIG. 2.

Hereinafter, the hologram film HF to which the protection film PF is attached will be referred to as a finished film CPF.

The finished film CPF may be moved to the cleaning part 116 through the auxiliary rollers. The cleaning part 116 may perform a bleaching and curing operation with respect to the finished film CPF. More specifically, the cleaning part 116 may perform the bleaching and curing operation with respect to the finished film CPF by emitting light to the finished film CPF. In the embodiments, the light emitted from the cleaning part 116 may be ultraviolet (UV) light. Through the bleaching and curing operation, a polymer structure except for a crystalline structure, which is aligned by optical energy remained on the finished film CPF to cause diffraction at a specific wavelength, may be separated to enhance an optical transmittance, remove foreign substances or the like, and strengthen durability of the finished film CPF.

The finished film CPF that has passed the cleaning part 116 may be moved through the auxiliary rollers and provided to the finished film rewinder 117. The finished film rewinder 117 may rewind the finished film CPF. In the embodiments, the finished film rewinder 117 may include a roller. The finished film rewinder 117 may rewind the finished film CPF while being rotated. The finished film CPF obtained by attaching the protection film PF to the hologram film HF in which the hologram has recorded may be stored by the finished film rewinder 117.

Figure 6:
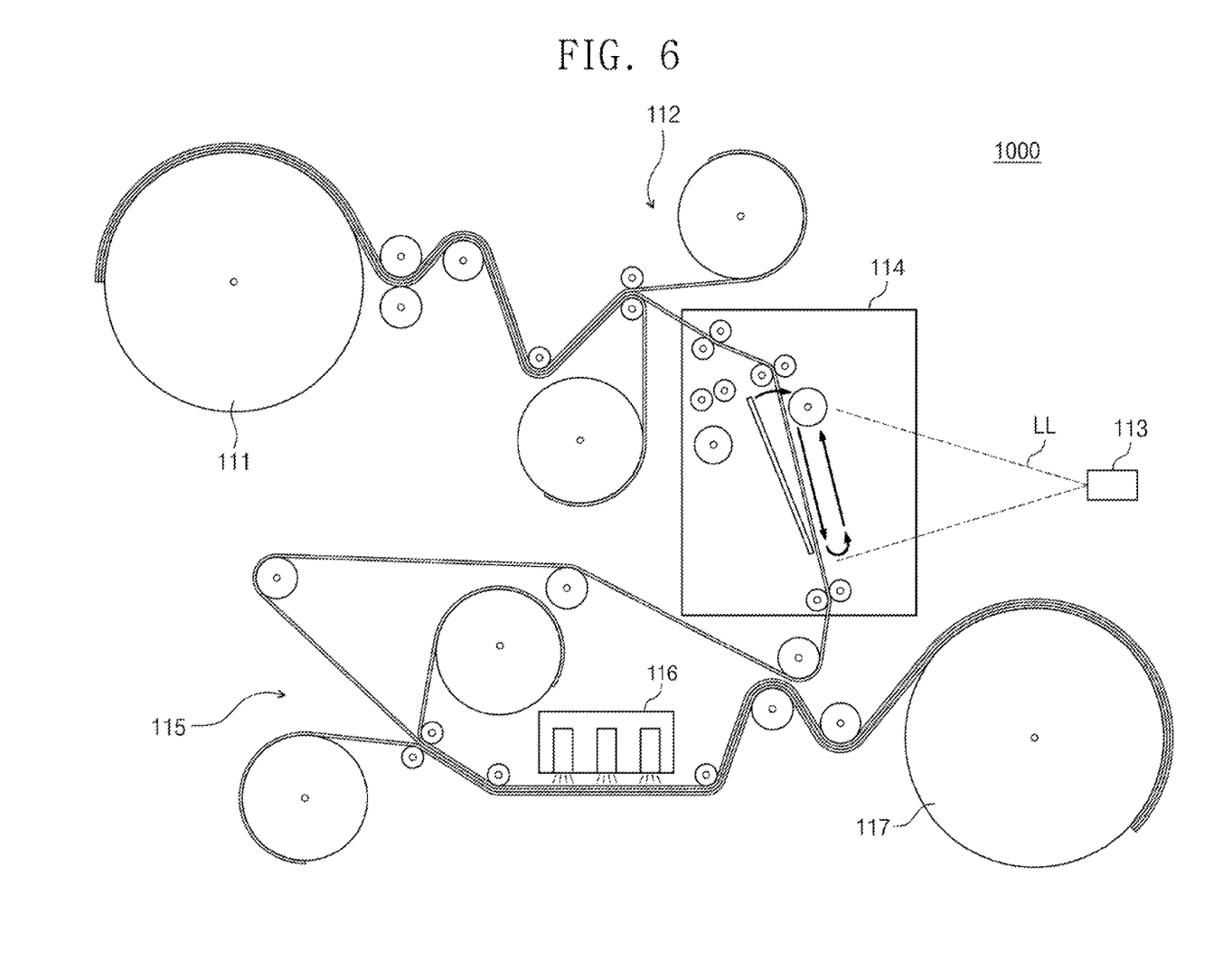
FIG. 6 is a cross-sectional view illustrating a hologram transcription apparatus according to the exemplary embodiments of the present invention.

FIG. 6 is a cross-sectional view illustrating a hologram transcription apparatus according to the exemplary embodiments of the present invention.

Referring to FIG. 6, a hologram transcription apparatus 1000 may include a photosensitive film unwinder 111, a protection film removing part 112, a light source part 113, an exposure part 114, a protection film supply part 115, a cleaning part 116, and a finished film rewinder 117. As these components are organically connected, the hologram transcription apparatus 1000 capable of performing batch control of a series of processes including supplying a photosensitive film SLF, removing a protection film PF, closely contacting a hologram film HF to a hologram original plate SSB, exposing by using a laser, attaching the protection film PF, performing a bleaching and curing process, and winding a finished film CPF may be realized.

Figure 7:
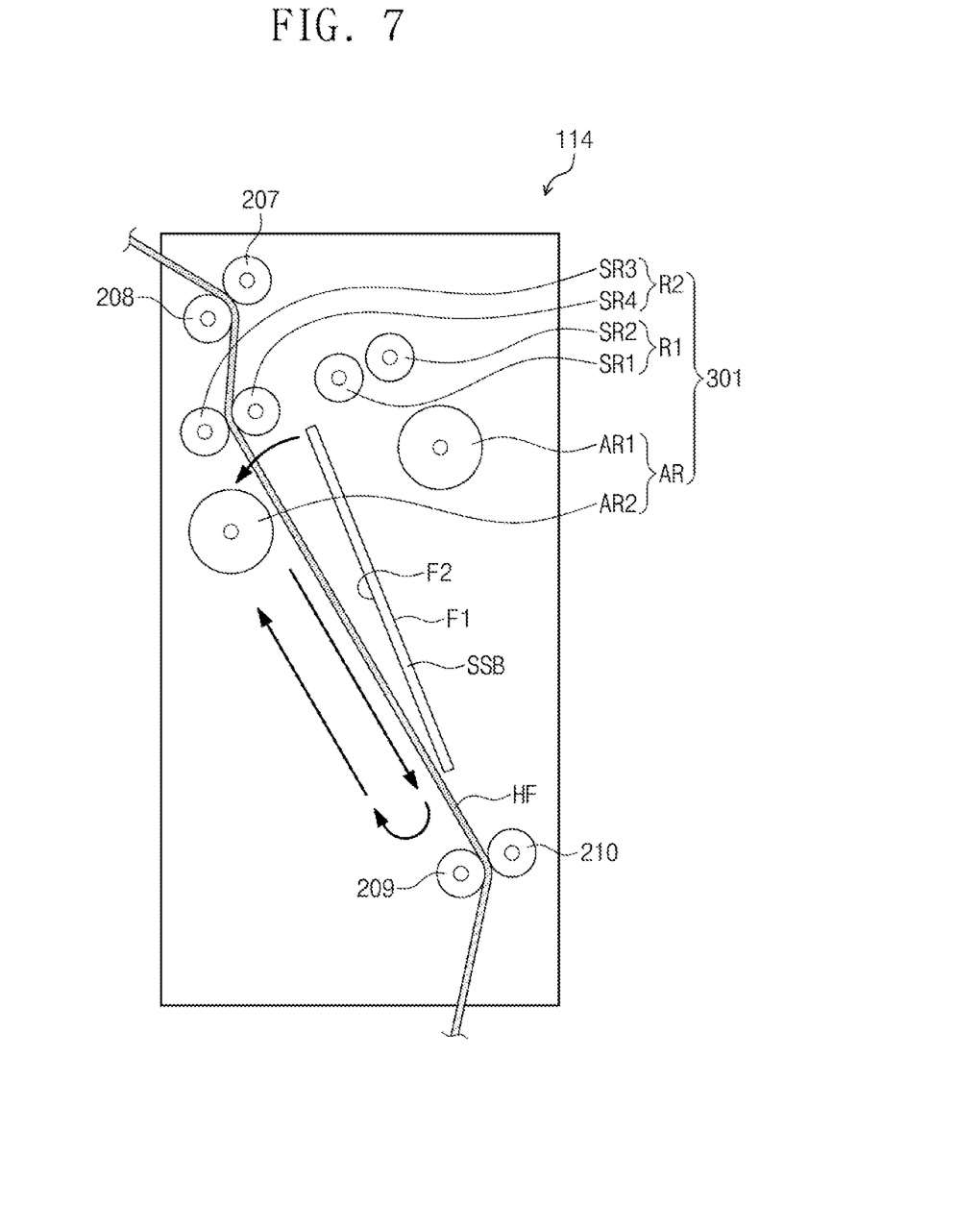
FIG. 7 is a cross-sectional view illustrating an exposure part of the hologram transcription apparatus according to the exemplary embodiments of the present invention.

FIG. 7 is a cross-sectional view illustrating an exposure part of the hologram transcription apparatus according to the exemplary embodiments of the present invention.

Hereinafter, features that are substantially the same as or similar to those described with reference to FIGS. 1 to 6 will be omitted for convenience of description.

Referring to FIG. 7, the hologram film HF may be moved to second rollers R2 by auxiliary rollers 207 and 208. In the embodiments, the second rollers R2 may include a third sub-roller SR3 and a fourth sub-roller SR4. The hologram film HF may be moved between the third sub-roller SR3 and the fourth sub-roller SR4. More specifically, the third sub-roller SR3 and the fourth sub-roller SR4 may be rotated in directions opposite to each other to move the hologram film HF toward the hologram original plate SSB. The hologram film HF may be moved to contact the hologram original plate SSB. More specifically, the hologram film HF may contact a second surface F2 of the hologram original plate SSB.

In a state in which the hologram film HF contacts the second surface F2, a second contact roller AR2 may be moved so that the hologram film HF closely contacts the second surface F2. More specifically, the second contact roller AR2 may be moved in the direction parallel to an extension direction of the hologram original plate SSB in a state of contacting the hologram film HF as described in the FIG. 7. In the embodiments, the second contact roller AR2 may be moved in the extension direction of the hologram original plate SSB or moved in the direction opposite to the extension direction of the hologram original plate SSB, so that the hologram film HF closely contacts the second surface F2. The hologram film HF may be disposed between the hologram original plate SSB and the second contact roller AR2.

As the second contact roller AR2 allows the hologram film HF to closely contact the hologram original plate SSB, bubbles and foreign substances may be prevented from being introduced between the hologram original plate SSB and the hologram film HF. The transcription of the hologram may be prevented from being distorted by unnecessary deformation of a light path or the deformation of the light as light LL is scattered by the bubbles and the foreign substances. The hologram film HF and the hologram original plate SSB may be moved in an integrated manner by allowing the hologram film HF to closely contact the hologram original plate SSB. A transcription distortion phenomenon of the hologram, which is generated by each vibration, may be prevented. A problem which the hologram film HF is deformed by tension because of repeating contact and separation with the hologram original plate SSB may be improved.

Figure 8A:
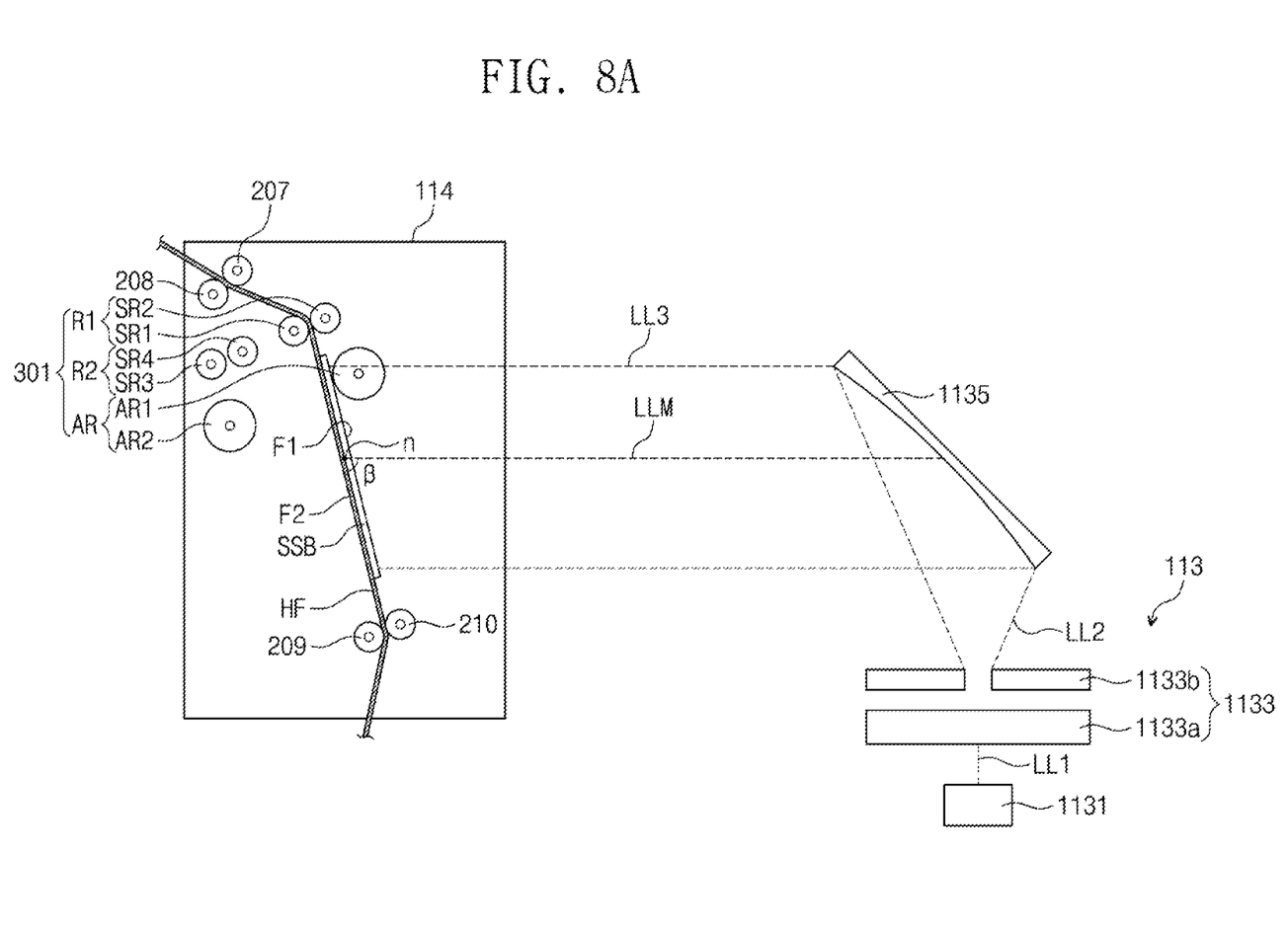
FIG. 8A is a cross-sectional view illustrating a transcription principle of the hologram transcription apparatus according to the exemplary embodiments of the present invention.

FIG. 8A is a cross-sectional view illustrating a transcription principle of the hologram transcription apparatus according to the exemplary embodiments of the present invention.

Referring to FIG. 8A, at a central point n at which a central axis LLM of third light LL3 meets the hologram film HF, the central axis LLM and the hologram film HF may form a predetermined angle β. In the embodiments, the angle β may be 0° to 180°.

In the embodiments, the third light LL3 may simultaneously arrive at an entire first surface F1 of the hologram original plate SSB. The third light LL3 may uniformly arrive at the entire first surface F1 of the hologram original plate SSB. In the embodiments, an area to which the third light LL3 is irradiated may be greater than an area of the first surface F1.

In the embodiments, the exposure part 114 may further include a light shielding layer (not shown) protecting the hologram film HF from light. The light shielding layer may absorb light except for the third light LL3 exposing the hologram film HF and the hologram original plate SSB.

The hologram may be recorded in the hologram film HF through the third light LL3. More specifically, the third light LL3 may arrive at the first surface F1 of the hologram original plate SSB. A portion of the light may travel straight to be transmitted through the hologram original plate SSB and escaped from the second surface F2. The light traveling straight may arrive at the hologram film HF. The other portion of the light may be diffracted at the hologram original plate SSB. The diffracted light may escape from the second surface F2. The diffracted light may arrive at the hologram film HF. A traveling direction of the diffracted light may be different from that of the light traveling straight. In the embodiments, the traveling direction of the diffracted light may form an angle of 0° to 180° with the traveling direction of the light traveling straight. The diffracted light may cause interference with the light traveling straight at the hologram film HF. An interference pattern of the two light may be recorded in the hologram film HF. The hologram film HF in which the interference pattern of the light has recorded may become a hologram. The hologram film HF in which the interference pattern of the light has recorded may be a transmission-type hologram. The interference pattern recorded in the hologram film HF may be substantially the same as or similar to that recorded in the hologram original plate SSB.

The hologram film HF in which the hologram has recorded may be moved to a coupling roller 501 and 502 through an auxiliary roller 209 and 210.

Figure 8B:
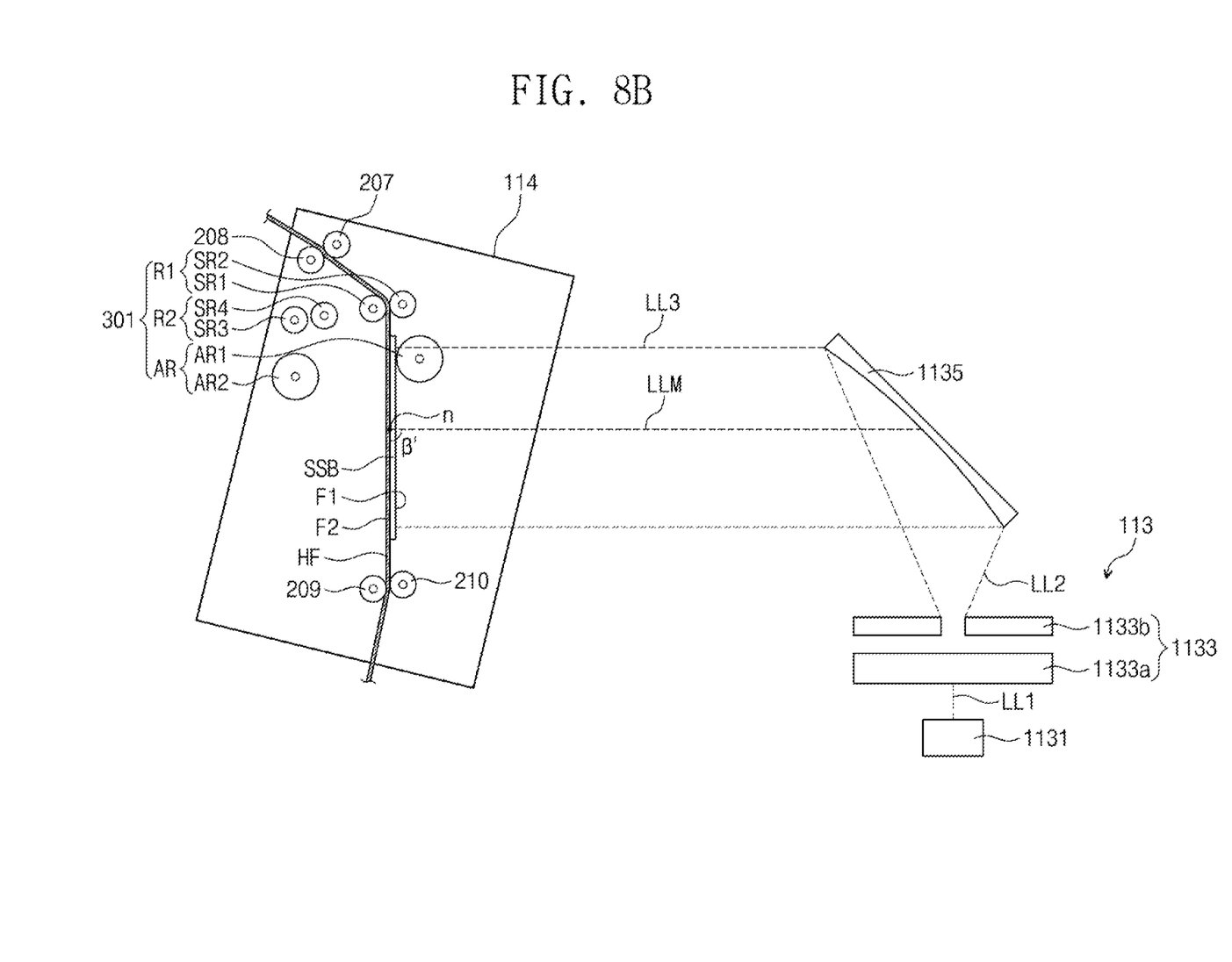
FIG. 8B is a cross-sectional view illustrating an operation process of the hologram transcription apparatus according to the exemplary embodiments of the present invention.

FIG. 8B is a cross-sectional view illustrating an operation process of the hologram transcription apparatus according to the exemplary embodiments of the present invention.

Referring to FIG. 8B, the exposure part 114 may be rotated. In the embodiments, the exposure part 114 may be rotated in the clockwise direction and/or the counter-clockwise direction. More specifically, the exposure part 114 may be rotated around a central point n. As the exposure part 114 is rotated, the hologram original plate SSB and the hologram film HF may be also rotated. The central axis LLM and the hologram film HF may form a predetermined angle β' at the central point n. The angle β and the angle β' may be different from each other.

The rotation of the exposure part 114 may be performed by various units. In the embodiments, the exposure part 114 may be rotated by a rotation shaft connected to the central point n. The rotation shaft may be directly/indirectly connected to a motor capable of rotating the rotation shaft or the like. In the embodiments, the exposure part 114 may be rotated by various units capable of rotating the exposure part 114.

As the exposure part 114 is rotated, an irradiation angle of the third light LL3 arriving at the hologram film HF and the hologram original plate SSB may be variously changed. Various interference patterns of the light may be recorded in the hologram film HF. Various transmission-type holograms may be manufactured.

According to the hologram transcription apparatus 1000 according to the embodiments of the present invention, since the exposure part 114 is rotated to change the irradiation angle of the light, the holograms may be manufactured at various angles by using one hologram transcription apparatus 1000. Since the exposure part 114 is moved, the light source part 113 may be unnecessary to be moved. The light source 1131, the filter 1133, and/or the reflection mirror 1135 may be unnecessary to be moved in order to rotate the light source part 113. A realignment operation of the light according to the rotation of the light source part 113 may be omitted. A process of manufacturing the hologram may be simplified and quickly performed. A manufacturing cost of the hologram may be reduced.

The hologram transcription apparatus 1000 according to the embodiments of the present invention may include all of the first rollers R1 and the second rollers R2. One hologram transcription apparatus 1000 may selectively perform the process of recording the hologram through the reflection of the light LL by the hologram original plate SSB and the process of recording the hologram through the transmission of the light LL through the hologram original plate SSB. All of the reflection-type hologram and the transmission-type hologram may be manufactured by one hologram transcription apparatus 1000. Several transcription apparatus may not be required to provide various holograms. A process of manufacturing the hologram may be simplified and quickly performed. A manufacturing cost of the hologram may be reduced.

Figure 9:
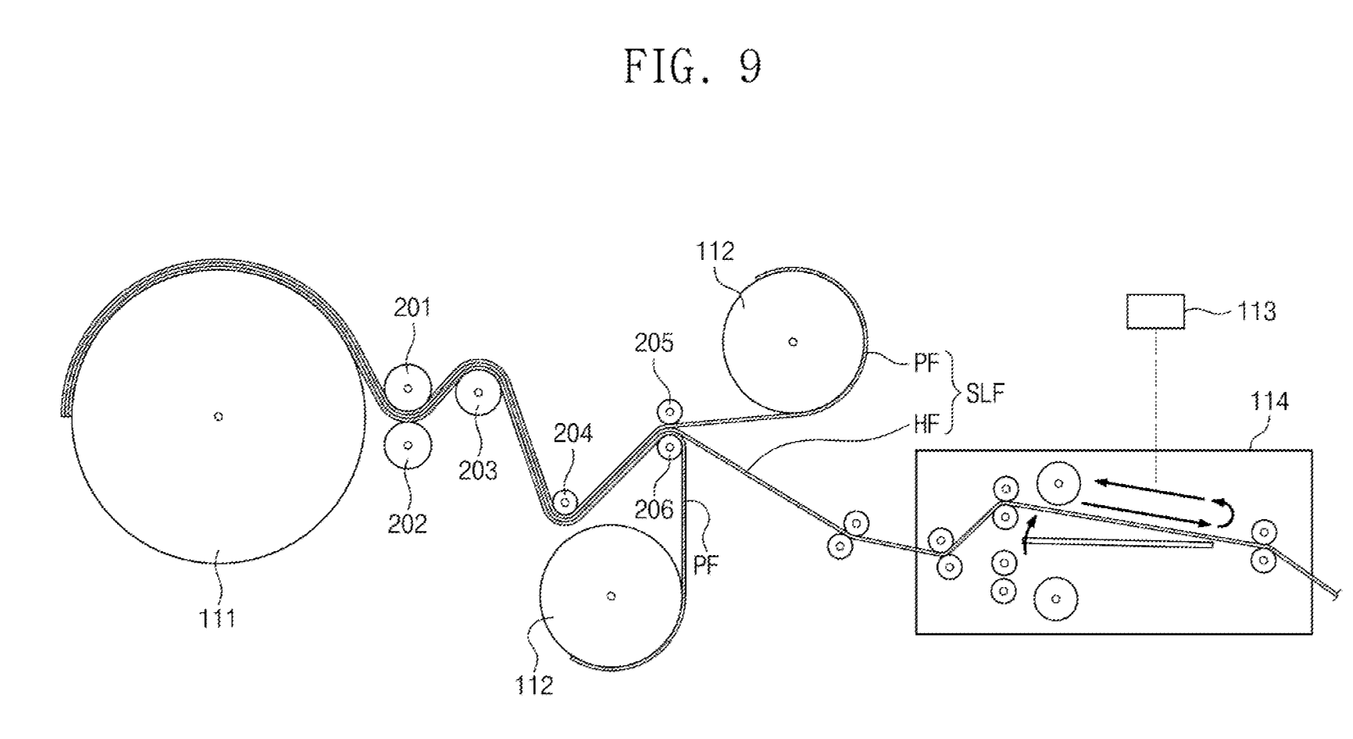
FIG. 9 is a cross-sectional view illustrating a supplying device of the hologram transcription apparatus according to the exemplary embodiments of the present invention.

FIG. 9 is a cross-sectional view illustrating the supplying device of the hologram transcription apparatus according to the exemplary embodiments of the present invention.

Hereinafter, features that are substantially the same as or similar to those described with reference to FIGS. 1 to 8B will be omitted for convenience of description.

Referring to FIG. 9, the exposure part 114 may extend in a horizontal direction. That is, the hologram original plate SSB may be disposed substantially parallel to the ground. The hologram film HF may be moved in parallel to the ground. The light source part 113 may irradiate light from the top to the bottom.

Although the embodiments of the present invention have been described with reference to the attached drawings, it is understood that the present invention should not be limited to these embodiments but various changes and modifications can be made by one ordinary skilled in the art within the spirit and scope of the present invention as hereinafter claimed. Thus, the above-disclosed embodiments are to be considered illustrative and not restrictive.

The invention claimed is:
1. A hologram transcription apparatus comprising:
an exposure part; and
a light source part configured to irradiate light to the exposure part including a hologram original plate,
wherein the exposure part comprises a transfer unit configured to transfer a hologram film and seat the hologram film on different sides of the hologram original plate depending on whether transmission-type holograms and reflection-type holograms are being manufactured, and the exposure part is rotatable to change an angle formed with the light enabling the manufacturing of the transmission-type holograms and the reflection-type holograms.

2. The hologram transcription apparatus of claim 1, wherein the hologram original plate is rotatable with respect to the transfer unit.

3. The hologram transcription apparatus of claim 1, wherein the hologram original plate comprises a first surface and a second surface distinguished from the first surface, the transfer unit comprises a first roller and a second roller, the first roller moves the hologram film onto the first surface, and the second roller moves the hologram film onto the second surface.

4. The hologram transcription apparatus of claim 1, wherein the light source part comprises:

a light source configured to emit light; and a reflection mirror configured to reflect the light emitted from the light source and irradiate the light to the exposure part, wherein the exposure part is rotated around a point at which a central axis of the light reflected by the reflection mirror meets the hologram film.

5. The hologram transcription apparatus of claim 4, wherein the light source part further comprises a filter disposed between the light source and the reflection mirror, and the filter comprises:

a lens configured to magnify the light emitted from the light source; and a pin hole configured to rectify the light magnified by the lens.

6. The hologram transcription apparatus of claim 4, wherein the light reflected by the reflection mirror is irradiated to the hologram film in the form of parallel light.

7. The hologram transcription apparatus of claim 1, wherein the exposure part forms an angle of 0° to 180° with the light.

8. A hologram transcription apparatus comprising:

a hologram original plate on which a first surface and a second surface disposed at an opposite side of the first surface are defined;

a transfer unit configured to transfer a hologram film and seat the hologram film on the hologram original plate; and a light source part configured to irradiate light to the hologram original plate, wherein the transfer unit comprises a first roller and a second roller, the first roller moves the hologram film onto the first surface and the second roller moves the hologram film onto the second surface depending on whether transmission-type holograms and reflection-type holograms are being manufactured.

9. The hologram transcription apparatus of claim 8, wherein the transfer unit further comprises:

a first contact roller disposed adjacent to the first surface; and a second contact roller disposed adjacent to the second surface, wherein the first contact roller or the second contact roller is moved in a direction parallel to an extension direction of the hologram original plate in a state in which the hologram film contacts the first surface or the second surface.

10. The hologram transcription apparatus of claim 9, wherein the first roller comprises a first sub-roller and a second sub-roller, and the hologram film is transferred between the first sub-roller and the second sub-roller and moved onto the first surface, and the second roller comprises a third sub-roller and a fourth sub-roller, and the hologram film is transferred between the third sub-roller and the fourth sub-roller and moved onto the second surface.

11. The hologram transcription apparatus of claim 10, further comprising a protection film supply part, wherein the protection film supply part attaches a protection film to the hologram film that has passed through the hologram original plate.

12. The hologram transcription apparatus of claim 11, further comprising a cleaning part, wherein the cleaning part cleans the hologram film to which the protection film is attached.

13. The hologram transcription apparatus of claim 9, wherein the hologram original plate is rotatable with respect to an irradiation direction of the light.

14. The hologram transcription apparatus of claim 13, wherein the hologram original plate is rotated around a point at which a central axis of the light irradiated to the hologram original plate meets the hologram original plate.

* * * * *